(12) United States Patent
Allen

(10) Patent No.: US 10,967,408 B2
(45) Date of Patent: Apr. 6, 2021

(54) PRESSURIZED CONDUIT RODDER

(71) Applicant: WESCO Distribution, Inc., Pittsburgh, PA (US)

(72) Inventor: Jerry L. Allen, Centennial, WY (US)

(73) Assignee: WESCO DISTRIBUTION, INC., Pittsburgh, PA (US)

(*) Notice: Subject to any disclaimer, the term of this patent is extended or adjusted under 35 U.S.C. 154(b) by 422 days.

(21) Appl. No.: 14/736,505

(22) Filed: Jun. 11, 2015

(65) Prior Publication Data
US 2016/0082487 A1   Mar. 24, 2016

Related U.S. Application Data

(60) Provisional application No. 62/082,206, filed on Nov. 20, 2014, provisional application No. 62/052,636, filed on Sep. 19, 2014.

(51) Int. Cl.
*B08B 9/032* (2006.01)
*H02G 1/08* (2006.01)

(52) U.S. Cl.
CPC .............. *B08B 9/032* (2013.01); *H02G 1/08* (2013.01); *H02G 1/086* (2013.01); *H02G 1/088* (2013.01)

(58) Field of Classification Search
CPC ........... B08B 9/00; B08B 9/027; B08B 9/032; B08B 9/0436; B08B 9/045; B08B 9/053; B08B 2209/045; B08B 2230/01; B08B 9/0321; H02G 1/086; H02G 1/08; H02G 1/088; H02G 1/083
See application file for complete search history.

(56) References Cited

U.S. PATENT DOCUMENTS

| 2,564,809 | A | | 8/1951 | Levene | |
|---|---|---|---|---|---|
| 2,722,237 | A | | 11/1955 | Rosel | |
| 3,080,265 | A | * | 3/1963 | Maasberg | B08B 9/0495 134/167 C |
| 3,880,176 | A | * | 4/1975 | Horne | E03F 9/00 118/306 |
| 5,151,657 | A | * | 9/1992 | Tashjian | G01V 3/08 324/326 |
| 5,503,190 | A | * | 4/1996 | Kamiyama | B29C 63/0069 138/108 |
| 5,862,561 | A | * | 1/1999 | Irwin | B08B 9/045 134/113 |

(Continued)

FOREIGN PATENT DOCUMENTS

| GB | 2 258 711 A | 2/1993 |
|---|---|---|
| JP | 59-121216 | 7/1984 |

(Continued)

OTHER PUBLICATIONS

Website advertisement (1 page—Undated—Admitted prior art).

(Continued)

*Primary Examiner* — Alexander Markoff
(74) *Attorney, Agent, or Firm* — Renner, Kenner, Greive, Bobak, Taylor & Weber

(57) ABSTRACT

A rodder assembly to be moved through an underground conduit includes a tube adapted to receive fluid under pressure. In some embodiments the rodder assembly includes at least one rigid rod, and a nozzle is attached to the tube to discharge fluid from the tube.

5 Claims, 5 Drawing Sheets

(56) References Cited

U.S. PATENT DOCUMENTS

| | | | |
|---|---|---|---|
| 5,988,188 A * | 11/1999 | Born | B08B 9/0433 |
| | | | 134/22.11 |
| 6,402,854 B1 * | 6/2002 | Horridge | B08B 7/02 |
| | | | 134/22.1 |
| 2003/0094298 A1 | 5/2003 | Morrow et al. | |
| 2008/0105319 A1 * | 5/2008 | Aniban, Jr. | A01M 21/043 |
| | | | 137/899.4 |

FOREIGN PATENT DOCUMENTS

| | | |
|---|---|---|
| JP | 10-286540 A | 10/1998 |
| JP | 2008-36504 A | 2/2008 |
| JP | 2013-85380 A | 5/2013 |
| JP | 2014-79695 A | 5/2014 |

OTHER PUBLICATIONS

Website advertisement (2 pages—Undated—Admitted prior art).
International Search Report (International Application No. PCT/US2015/040682) (dated Nov. 20, 2015—4 pages).
Written Opinion of the International Searching Authority (International Application No. PCT/US2015/040682) (undated—6 pages).
EPO Examination Report (Application No. 15 753 517.0) (6 pages—dated Oct. 29, 2018).

\* cited by examiner

PRESSURIZED CONDUIT RODDER

CROSS-REFERENCE TO RELATED APPLICATIONS

This application claims priority from U.S. Provisional Patent Application No. 62/052,636 filed on Sep. 19, 2014 and U.S. Provisional Patent Application No. 62/082,206 filed on Nov. 20, 2014.

TECHNICAL FIELD

The present invention relates to a rodder assembly for use in moving through an underground conduit so that a cable may be easily inserted into the conduit. More particularly, this invention relates to such a rodder assembly which is pressurized for efficient use.

BACKGROUND ART

Duct or conduit rodders are devices which are inserted into underground conduits to clear a path in the conduit so that a cable may be placed into the conduit. Specifically, a duct rodder, which is a rod typically made of fiberglass, is pushed into an underground conduit, for example at a manhole, and is intended to extend to a second manhole which could possibly be a thousand feet or more away from the first manhole. During that process, it is the intent that the rod will move any obstruction, such as dirt, mud, or other cables already in the conduit, out of the way. Then at the second manhole, a tape or rope is attached to the rod, and the rod is then pulled back through the conduit exposing the tape at the first manhole. At that time, a cable which is to be placed in the conduit is attached to the tape, and the cable may be inserted into the conduit by pulling on the tape at the location of the second manhole.

A problem with these rodders is that they tend to flex or undulate as they move through the conduit which limits the distance that they are effective. This problem is magnified if there are obstructions in the conduit which cause potential additional flexing. As such, the rodders could become lodged in the conduit rendering their effort fruitless, or at a minimum, they are only usable for short manhole runs of four to six hundred feet at most.

Thus, the need exists for a duct rodder that can extend through a conduit without being obstructed and without flexing or undulating.

DISCLOSURE OF THE INVENTION

It is therefore an object of one aspect of the present invention to provide a rodder assembly which includes a component pressurized with a fluid which is emitted to assist in the movement of the rodder assembly through the conduit.

It is an object of another aspect of the present invention to provide a rodder assembly, as above, with a rigid component.

These and other objects of the present invention, as well as the advantages thereof over existing prior art forms, which will become apparent from the description to follow, are accomplished by the improvements hereinafter described and claimed.

In general, an apparatus to be moved through an underground conduit includes a rodder assembly having a tube adapted to receive fluid under pressure. Means to discharge the fluid from the tube are provided.

In accordance with another aspect of the invention, a method to be performed in an underground conduit includes the steps of inserting a tube into the conduit, providing fluid under pressure to the tube, and emitting the fluid from the tube.

A preferred exemplary rodder assembly according to the concepts of the present invention is shown by way of example in the accompanying drawings without attempting to show all the various forms and modifications in which the invention might be embodied, the invention being measured by the appended claims and not by the details of the specification.

PREFERRED EMBODIMENTS FOR CARRYING OUT THE INVENTION

Figure 1:
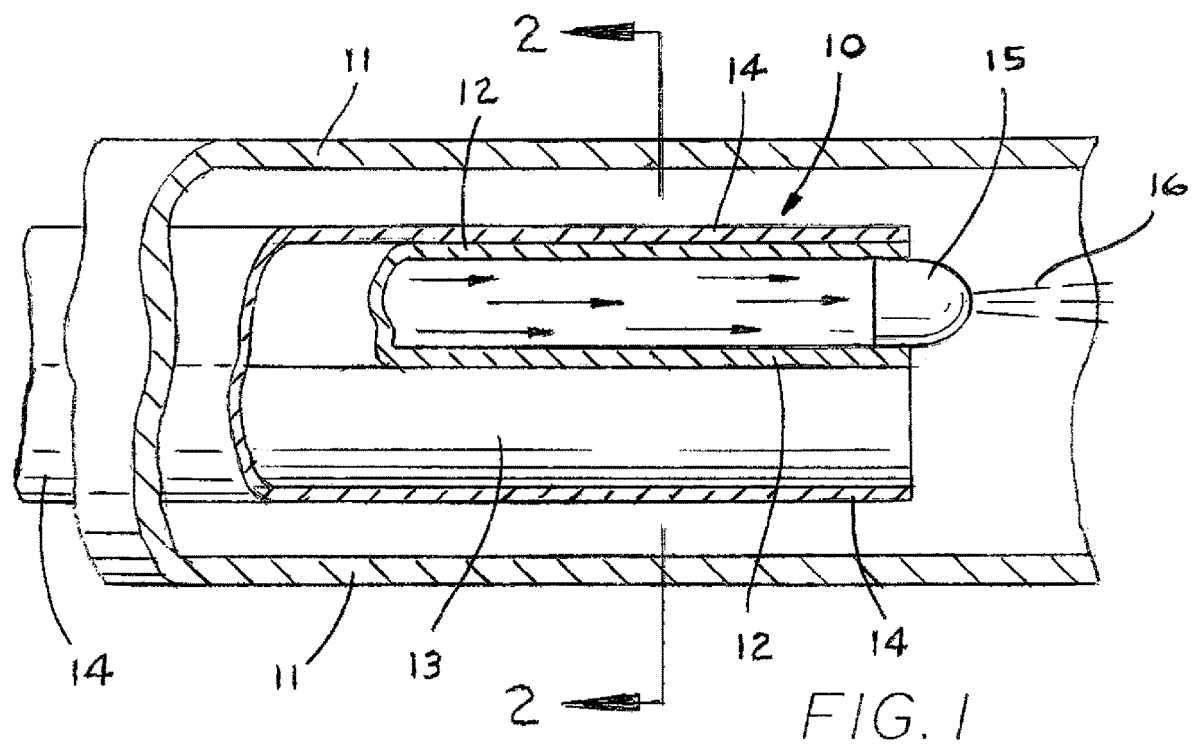
FIG. 1 is a broken away sectional view of a conduit showing a rodder assembly, made in accordance with one embodiment of the present invention, passing therethrough.
Figure 2:
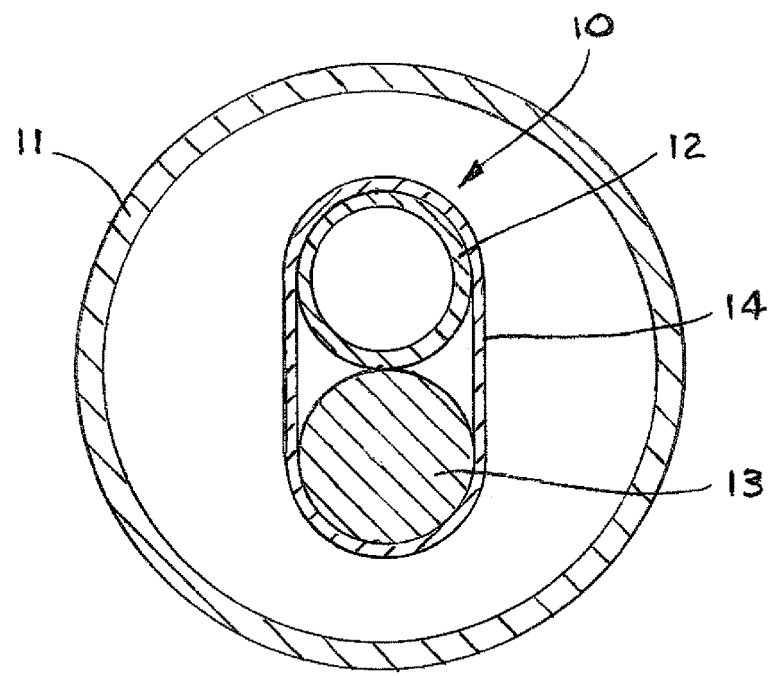
FIG. 2 is a sectional view taken substantially along line 2-2 of FIG. 1.

A duct rodder assembly made in accordance with one embodiment of the present invention is generally indicated by the numeral 10 in FIGS. 1 and 2. Typically, up to a thousand feet of rodder assembly 10 is provided on a reel and is intended to be payed off of that reel and fed into an underground conduit 11.

Rodder assembly 10 includes a hollow tube or hose 12 preferably made of a coilable material, and a rod 13 which can be made of a coilable material such as fiberglass, steel, or the like. Tube 12 and rod 13 are shown as being held together by a sleeve 14 which can be made of a low friction fabric material or the like and which maintains tube 12 and rod 13 attached together as they move through conduit 11. Alternatively, tube 12 and rod may be attached by providing a plurality of clamps, or the like spaced along their length.

A nozzle 15 is attached to the leading end of tube 12, and the trailing of tube 12 is open. When rodder assembly 10 is inserted into and being pushed through conduit 11, a fluid under pressure, which could be a liquid or a gas, is inserted through the open trailing end of tube 12. The fluid exits tube 12 through a port of nozzle 15 as a forward jet 16 which can act to clear away any impediments in the path of rodder assembly 10. Rod 13 provides rodder assembly 10 with a degree of rigidity to ultimately clear the path.

Figure 3:
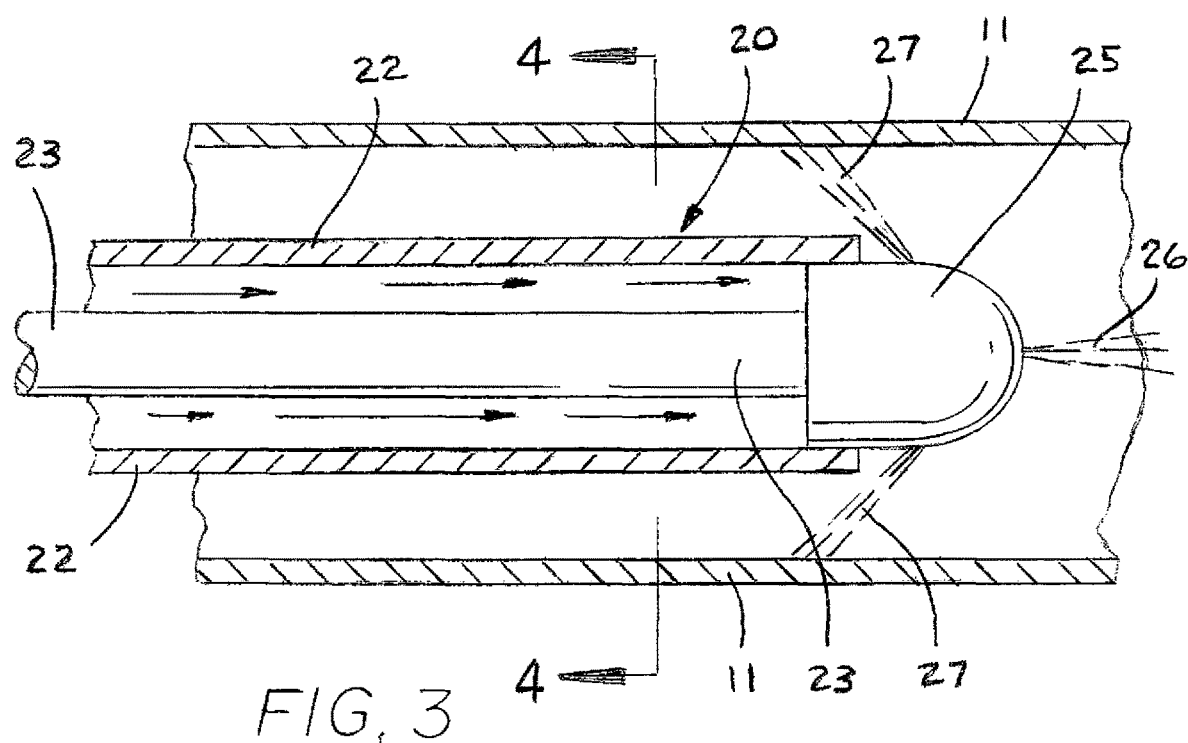
FIG. 3 is a broken away sectional view of a conduit showing a rodder assembly, made in accordance with another embodiment of the present invention, passing therethrough.
Figure 4:
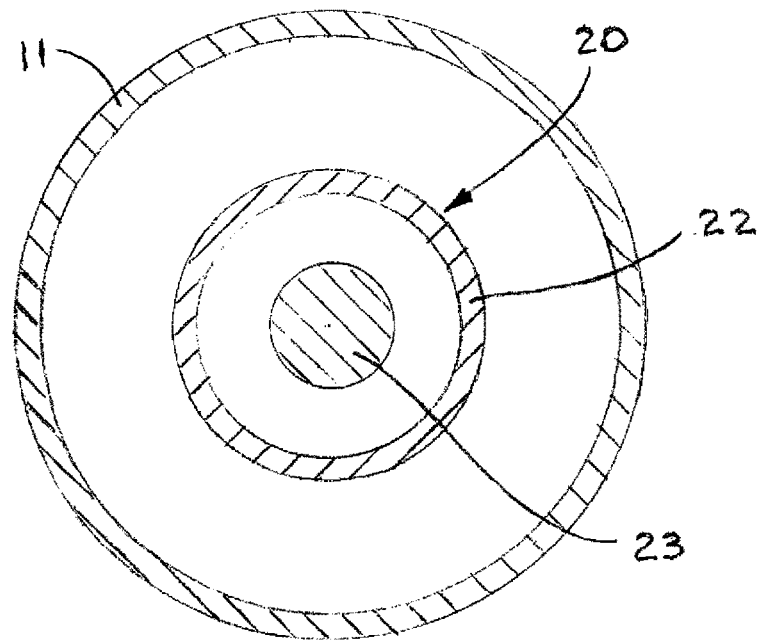
FIG. 4 is a sectional view taken substantially along line 4-4 of FIG. 3.

Another embodiment of the invention is shown in FIGS. 3 and 4. There, a rodder assembly 20, which can be provided on a reel for insertion into a conduit 11, includes a flexible tube or hose 22 having a rod 23, preferably made of a callable material such as fiberglass, steel, or the like, positioned thereon. A nozzle 25 is positioned at the leading end of tube 22 and can be attached to the leading end of rod 23. Nozzle 25 may be provided with a front opening and a plurality of side openings such that when a fluid under pressure, such as a gas or liquid, is provided to tube 22, a forward jet 26 of fluid and a plurality or rearward jets 27 of fluid are emitted from nozzle 24. Such rearward jets 27 may also be provided in nozzle 15 of the embodiment of FIGS. 1 and 2.

As the tube 22 and rod 23 are pushed through conduit 11 with fluid pressure in tube 22, the fluid maintains rod 23 straight and centered in tube 22. The straight rod 23, with assistance from the forward jet 26, thus moves obstructions out of the way. The rearward jets 27 can assist in the propulsion of the rodder assembly 20 through conduit 11.

Figure 5:
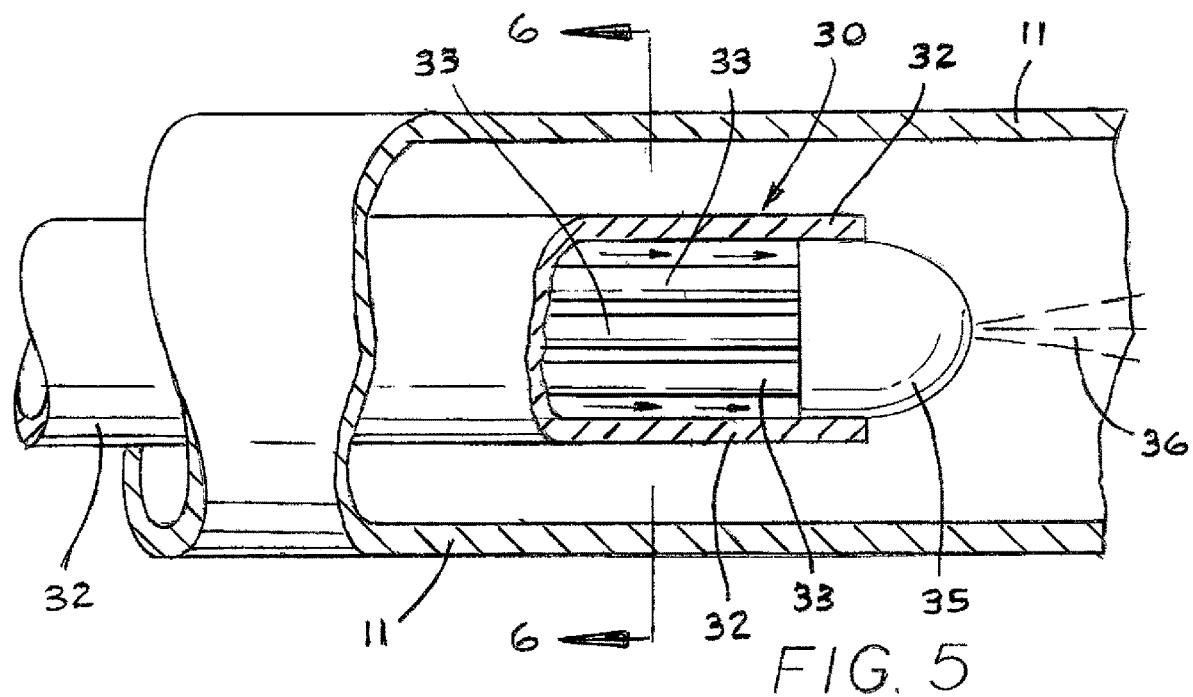
FIG. 5 is a broken away sectional view of a conduit showing a rodder assembly, made in accordance with another embodiment of the present invention, passing therethrough.
Figure 6:
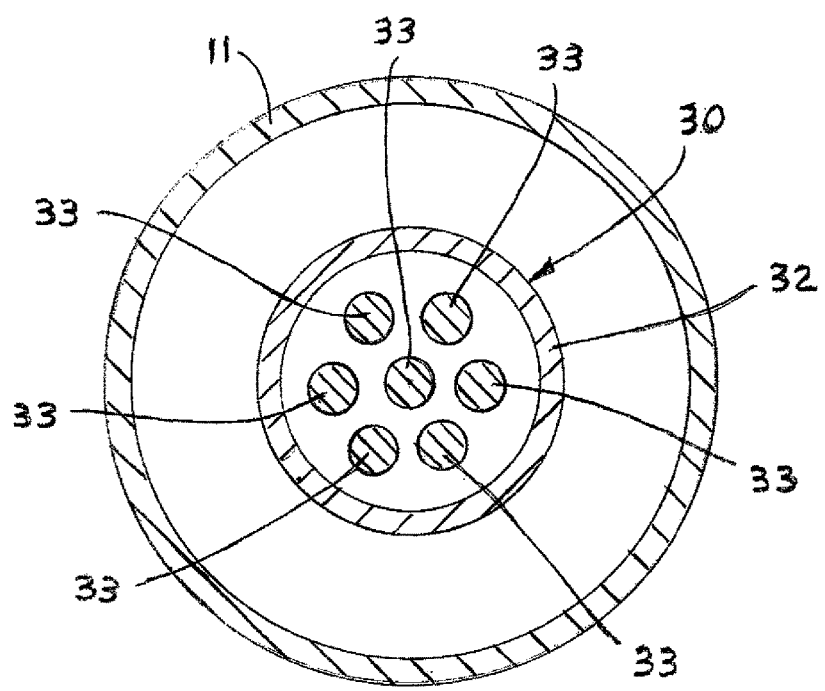
FIG. 6 is a sectional view taken substantially along line 6-6 of FIG. 5.

Alternatively, as shown in FIGS. 5 and 6, the single rod 23 inside of tube 22 may be replaced by a plurality of rods 33 inside of tube 32 of rodder assembly 30. Just as in the embodiment of FIGS. 3 and 4, a nozzle 35 is positioned in the leading edge of tube 32 and can be attached to the leading edges of rods 33. Nozzle 35 is shown as having a front port such that when a fluid under pressure is provided to tube 32, a forward jet 36 of fluid is emitted from nozzle 35. If desired, nozzle 35 could also be configured to emit rearward jets similar to jets 27 of the embodiment of FIGS. 3 and 4.

As the tube 32 and rods 33 are pushed through conduit 11 with fluid pressure in tube 32, the fluid maintains rods 33 straight within tube 32. These rods, with the assistance of forward jet 36 move obstructions in conduit 11 out of the way. The embodiment of FIGS. 5 and 6 are most useful in a conduit 11 of a larger diameter.

Figure 7:
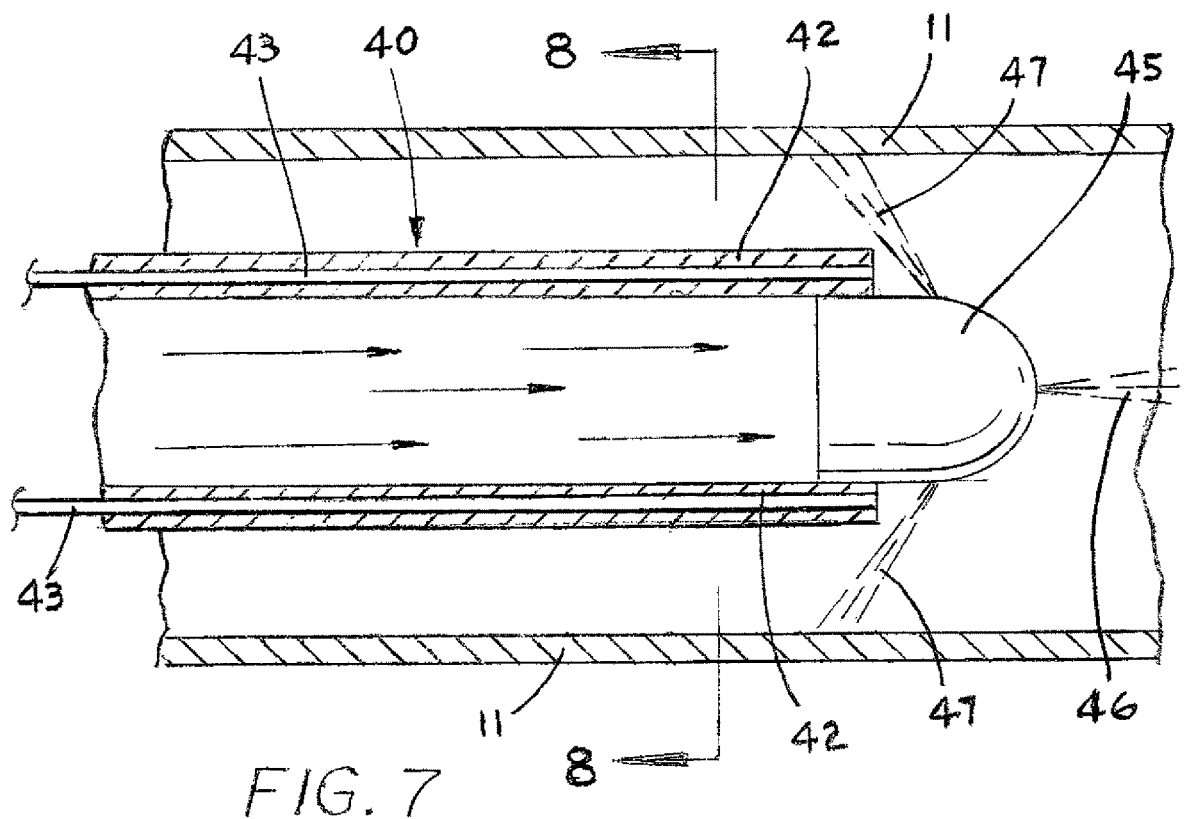
FIG. 7 is a broken away sectional view of a conduit showing a rodder assembly, made in accordance with another embodiment of the present invention, passing therethrough.
Figure 8:
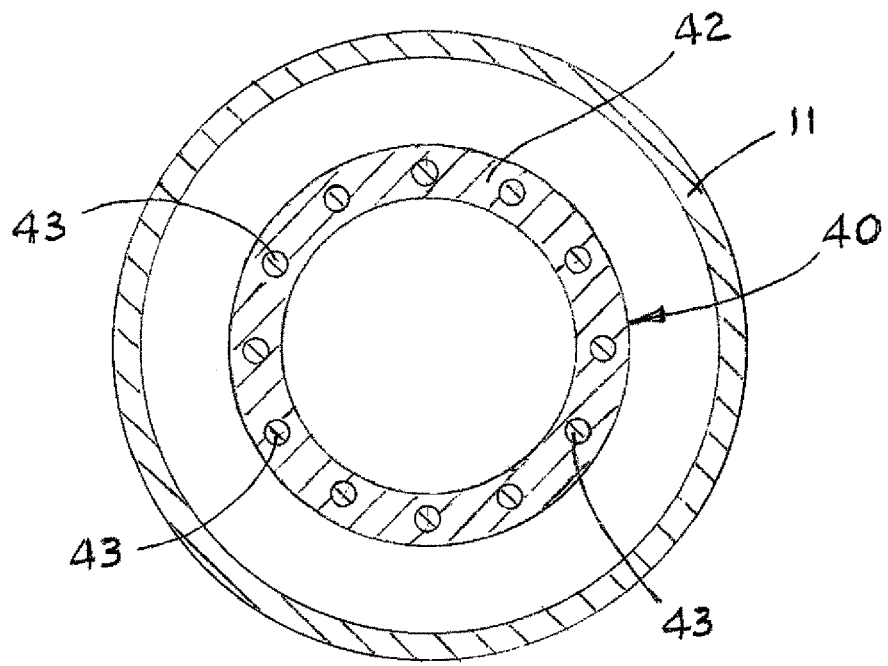
FIG. 8 is a sectional view taken substantially along line 8-8 of FIG. 7.

In the alternative embodiment shown in FIGS. 7 and 8, a rodder assembly 40 includes a flexible tube or hose 42 having a plurality of rods 43 embedded in its body. Rods are made of a coilable material such as fiberglass, steel, or the like. A nozzle 45 is positioned at the leading end of tube 42 and can be provided with a front opening and a plurality of side openings such that when a fluid under pressure, such as a gas or liquid, is provided to tube 42, a forward jet 46 of fluid and a plurality of rearward jets 47 of fluid are provided by nozzle 45.

As in the other embodiments, when tube 42 is pushed through conduit 11 with fluid pressure therein, rods 43 maintain tube 42 straight, and with the assistance from the forward jet 46, hose 42 moves obstructions out of the way. The rearward jets 47 assist in the propulsion of the rodder assembly 20 through conduit 11.

Figure 9:
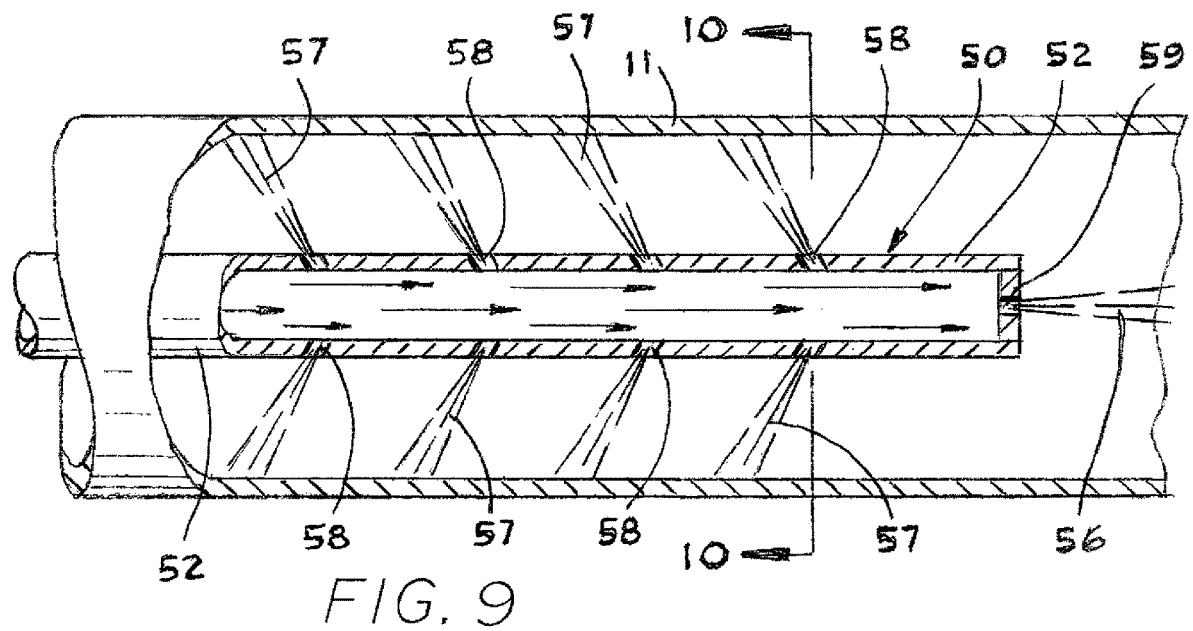
FIG. 9 is a broken away sectional view of a conduit showing a rodder assembly, made in accordance with another embodiment of the present invention, passing therethrough.
Figure 10:
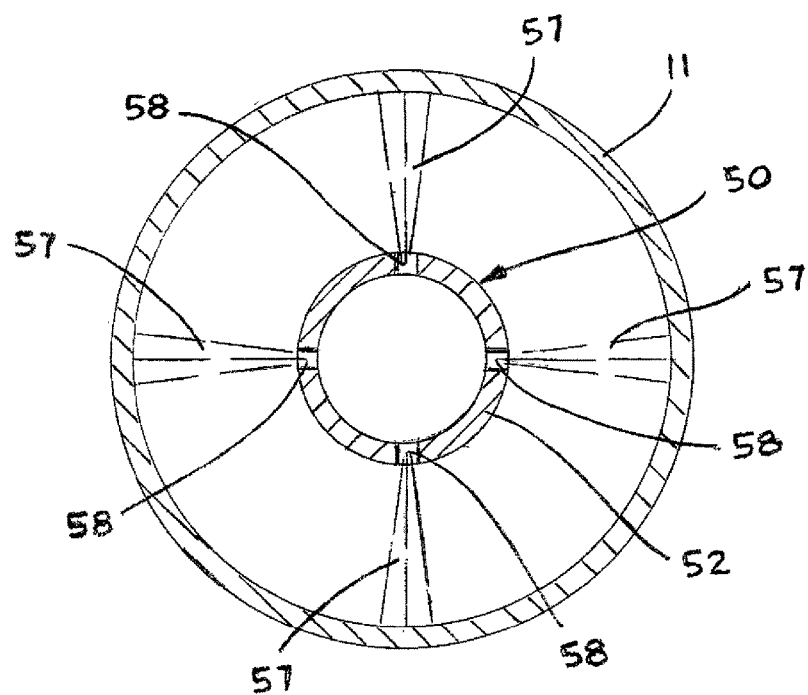
FIG. 10 is a sectional view taken substantially along line 10-10 of FIG. 9.

The rodder assembly 50 of the embodiment shown in FIGS. 9 and 10 includes a hollow tube 52 preferably made of a coilable material such as fiberglass, steel, or the like. Tube 52 is provided with longitudinally spaced apertures or ports 58 which may be spaced approximately ten feet or greater from each other. At each longitudinal location, ports 58 are circumferentially spaced preferably ninety degrees of each other as shown in FIG. 10. The leading end of tube 52 is closed except for an aperture 59.

The trailing end of tube 52 is open, and when tube 52 is inserted into conduit 11, a fluid under pressure is inserted into tube 52 through that open end. The fluid could either be a liquid or a gas, as desired. As shown, the fluid exists tube 52 through ports 58 as fluid jets 57. As jets 57 leave tube 52, they impinge upon the inside surface of conduit 11 which maintains tube 52 generally straight and centered within the conduit 11. If desired, jets 57 can be directed somewhat rearwardly, as shown in FIG. 9, thus assisting the propulsion of tube 52 through conduit 11. In addition, the fluid exits aperture 59 as forward jet 56 which can act to clear away impediments in the path of tube 52.

As described, at least a large length, if not the entire length, of tube 52 is provided with ports 58. In order to prevent fluid from exiting the ports 58 which are not yet in the conduit 11, the ports 58 may be provided with caps that are removed as they enter conduit 11. Alternatively, the ports 58 may be provided only on a leading portion of tube 52, for example, the first one hundred to two hundred feet of tube 52, and when that portion is in the conduit 11, the pressurized fluid can then be inserted into tube 52. The straight leading portion would be sufficient to insure that the entire tube 52 is maintained straight.

It should thus be evident that a rodder assembly constructed in accordance with any of the embodiments described herein accomplishes the objects of the present invention and otherwise substantially improves the art.

What is claimed is:

1. Apparatus to be moved through an underground conduit comprising a rodder assembly, said rodder assembly including a unitary tubular hose having a generally cylindrical outer surface and a generally cylindrical inner surface forming a single wall between said surfaces, a chamber formed within said inner surface and extending for a length, said chamber being adapted to receive fluid under pressure, a plurality of rods circumferentially spaced in said wall for substantially the entire length of said hose, and means to discharge fluid from said hose rearwardly against the conduit to propel the apparatus through the conduit and to maintain said hose properly positioned in the conduit.

2. The apparatus of claim 1 wherein said means to discharge fluid from said hose also includes a nozzle attached to said hose.

3. A method to be performed in an underground conduit using a unitary tubular hose having an outermost surface and an innermost surface forming a single wall between the surfaces, and using rigid rods, comprising the steps of inserting the rigid rods into the wall, pushing the hose forwardly into the conduit, providing fluid under pressure to the hose, and emitting fluid from the hose in a rearwardly direction to assist in the pushing step and to maintain the hose properly positioned in the conduit.

4. The method of claim 3 further comprising the step of attaching a nozzle to the hose to emit fluid in the forward direction.

5. The method of claim 3 further comprising the step of forming a plurality of spaced openings along the hose to perform the step of emitting fluid.

* * * * *